US012693138B2

(12) United States Patent
Pliete et al.

(10) Patent No.: US 12,693,138 B2
(45) Date of Patent: Jul. 28, 2026

(54) METHODS AND APPARATUS FOR ELECTRONIC SENSOR ADJUSTMENTS

(71) Applicant: EPRO GmbH, Gronau (DE)

(72) Inventors: Christian Pliete, Ochtrup (DE); Thomas Wewers, Stadtlohn (DE)

(73) Assignee: EPRO GmbH, Gronau (DE)

( * ) Notice: Subject to any disclaimer, the term of this patent is extended or adjusted under 35 U.S.C. 154(b) by 264 days.

(21) Appl. No.: 18/477,932

(22) Filed: Sep. 29, 2023

(65) Prior Publication Data

US 2025/0109968 A1    Apr. 3, 2025

(51) Int. Cl.
| | |
|---|---|
| *G01D 5/16* | (2006.01) |
| *G01B 7/30* | (2006.01) |
| *G01C 25/00* | (2006.01) |
| *G01D 11/30* | (2006.01) |
| *G01H 1/00* | (2006.01) |
| *G01P 1/02* | (2006.01) |
| *G01P 15/18* | (2013.01) |
| *G01P 21/00* | (2006.01) |
| *H02K 11/21* | (2016.01) |

(52) U.S. Cl.
CPC ................. *G01D 5/16* (2013.01); *G01B 7/30* (2013.01); *G01C 25/005* (2013.01); *G01D 11/30* (2013.01); *G01H 1/00* (2013.01); *G01P 1/023* (2013.01); *G01P 15/18* (2013.01); *G01P 21/00* (2013.01); *H02K 11/21* (2016.01)

(58) Field of Classification Search
CPC .......... G01P 1/023; G01P 15/18; G01P 21/00; G01C 25/005; G01D 11/30; G01D 5/16; G01H 1/00
See application file for complete search history.

(56) References Cited

U.S. PATENT DOCUMENTS

| | | | |
|---|---|---|---|
| 3,165,913 A | 1/1965 | Perls et al. | |
| 4,817,417 A * | 4/1989 | Twerdochlib .......... | G01H 1/006 73/660 |
| 5,408,894 A * | 4/1995 | Henson ..................... | G01P 1/04 73/866.5 |
| 5,626,703 A * | 5/1997 | Tomita .............. | B29C 66/91431 156/244.11 |
| 2010/0218588 A1* | 9/2010 | Staniewicz .......... | G01D 5/2497 73/1.75 |

(Continued)

OTHER PUBLICATIONS

International Searching Authority, "International Search Report," issued in connection with International Patent Application No. PCT/EP2024/077177, mailed on Feb. 1, 2025, 3 pages.

(Continued)

*Primary Examiner* — Helen C Kwok
(74) *Attorney, Agent, or Firm* — Hanley, Flight & Zimmerman, LLC

(57) ABSTRACT

Methods and apparatus for electronic sensor adjustment are disclosed. A disclosed example sensor device for use with an asset includes a housing to be coupled to the asset, a data acquisition sensor to provide first sensor output, a position sensor to provide second sensor output, the position sensor having a movable portion, and programmable circuitry to execute instructions to determine, based on the second sensor output, an offset of the movable portion for adjustment of the first sensor output, and adjust the first sensor output based on the offset.

20 Claims, 12 Drawing Sheets

(56) References Cited

U.S. PATENT DOCUMENTS

| | | | |
|---|---|---|---|
| 2011/0202225 A1 | 8/2011 | Willis et al. | |
| 2013/0338955 A1 | 12/2013 | Landers et al. | |
| 2020/0025785 A1 | 1/2020 | Zusman | |
| 2021/0123714 A1* | 4/2021 | Schneider | .......... G01R 33/0206 |

OTHER PUBLICATIONS

International Searching Authority, "Written Opinion of the International Searching Authority," issued in connection with International Patent Application No. PCT/USEP2024/077177, mailed on Feb. 1, 2025, 7 pages.

International Searching Authority, "International Preliminary Report on Patentability," issued in connection with International Patent Application No. PCT/EP2024/077177, mailed on Apr. 9, 2026, 9 pages.

European Patent Office," Communication pursuant to Rules 161(1) and 162 EPC," mailed in connection with European Patent Application No. 24782539.1, dated May 13, 2026, 3 pages.

* cited by examiner

METHODS AND APPARATUS FOR ELECTRONIC SENSOR ADJUSTMENTS

FIELD OF THE DISCLOSURE

This disclosure relates generally to sensors and, more particularly, to methods and apparatus for electronic sensor adjustments.

BACKGROUND

Typically, data acquisition sensors, such as vibration sensors, can measure parameters in a coordinate system including three orthogonal axes (commonly referred to as x, y, z). More specifically, an accelerometer is a type of sensor that can measure along an axis commonly aligned to the general direction of gravity (z), as well as other directions (x, y). For vibration measurements, the aforementioned coordinate system is to be aligned with respective coordinate systems of an asset to ensure accurate data collection. Due to assembly, human error, lack of alignment features, tolerances and/or mounting limitations, a sensor orientation can be misaligned with respect to the asset and/or a reference frame associated with the asset.

SUMMARY

Examples disclosed herein can enable effective adjustment of sensor output for sensors that measure and/or utilize directional components. Accordingly, examples disclosed herein enable an operator/installer to displace and/or move a movable portion of a position sensor such that an offset and/or positional displacement of the movable portion is utilized to correct and/or adjust output from a data acquisition sensor. The movable portion can be guided by a target or other visual cue. In a specific example, a vibration sensor/monitor does not necessitate physical alignment since the offset of the movable portion can be utilized to correct, offset and/or transform output from the vibration sensor/monitor.

An example sensor device for use with an asset includes a housing to be coupled to the asset, a data acquisition sensor to provide first sensor output, a position sensor to provide second sensor output, the position sensor having a movable portion, and programmable circuitry to execute instructions to determine, based on the second sensor output, an offset of the movable portion for adjustment of the first sensor output, and adjust the first sensor output based on the offset.

An example apparatus for adjustment of output from a data acquisition sensor of a sensor device includes interface circuitry communicatively coupled to a position sensor of the sensor device, machine readable instructions, and programmable circuitry to at least one of instantiate or execute the machine readable instructions to determine an offset of a movable portion of the position sensor, determine an adjustment of the output of the data acquisition sensor based on the offset, and adjust the output of the data acquisition sensor based on the adjustment.

An example non-transitory machine readable storage medium includes instructions to cause programmable circuitry to at least determine a positional deviation of a movable portion of a position sensor, the offset corresponding to orienting the movable portion with respect to a reference, determine an adjustment of output of a data acquisition sensor based on the positional deviation, and adjust the output based on the determined adjustment.

An example method includes coupling a sensor device to an asset, the sensor device including a data acquisition sensor, adjusting an orientation of a movable portion of a position sensor based on a reference corresponding to the asset, and causing the data acquisition sensor to operate such that output from the data acquisition sensor is adjusted based on the orientation of the movable portion.

Figure 1:
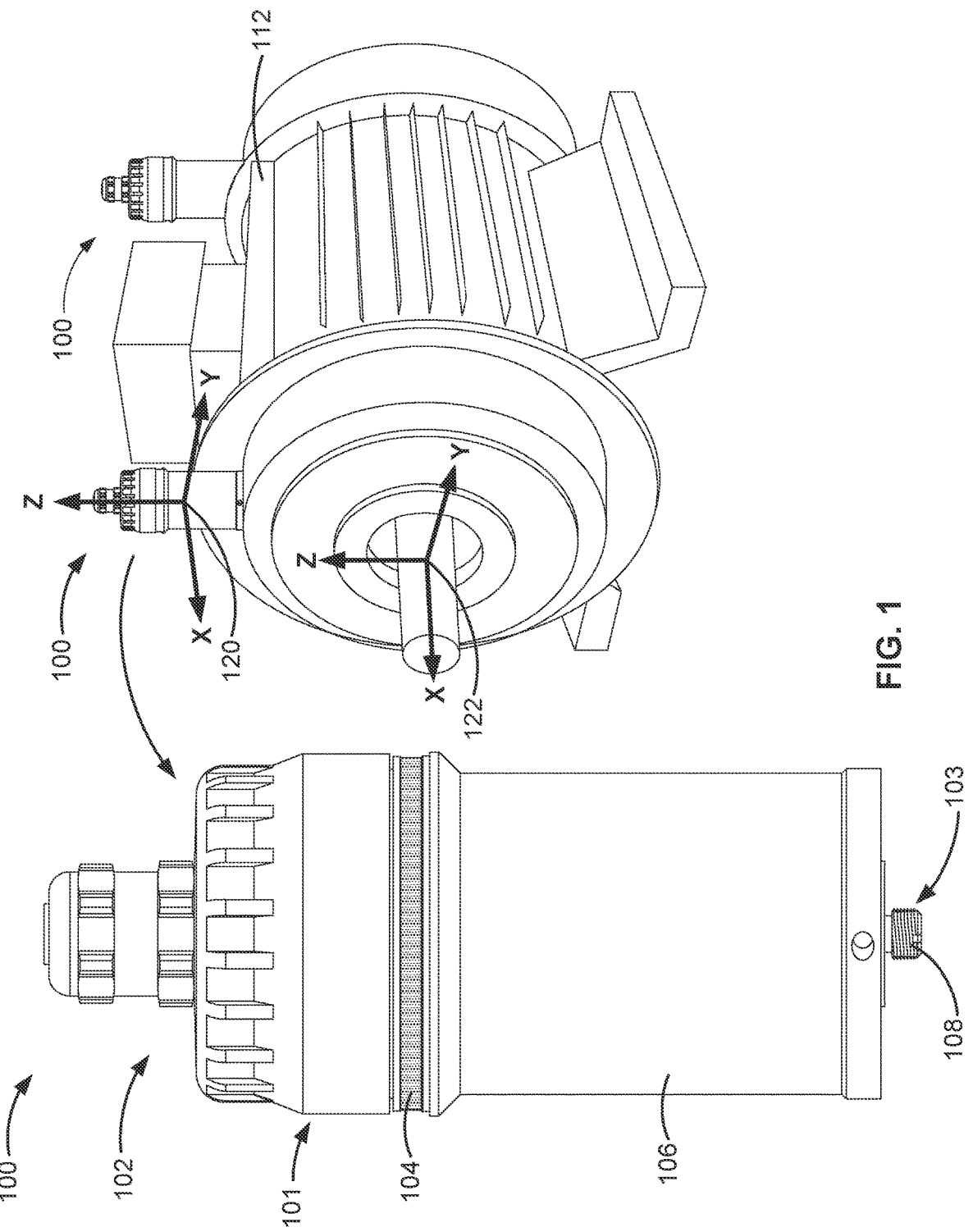
FIG. 1 illustrates an example data acquisition sensor device constructed in accordance with teachings of this disclosure and coupled to a motor device.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus for electronic sensor adjustment are disclosed. Some data acquisition sensor devices, such as vibration monitors/sensors, often necessitate positional and/or orientational alignment to an asset (e.g., a generator, a motor, etc.) for relatively accurate data collection. In particular, the sensor devices acquire data having directional components (e.g., vectors with corresponding magnitudes) and are typically mounted to the asset, which can have its own associated placement and/or coordinate reference frames. It is often desired for the sensor device to be mounted to the asset such that a first reference frame (defined by the directional components) of the sensor device is aligned or coordinated with a second reference frame of the asset. For instance, determining specific functioning characteristics of the asset can depend on correctly characterizing directions of vibrations (e.g., vibrations in an axial direction of the asset can result in a first diagnosis while vibrations in a radial direction of the asset can result in a second diagnosis different from the first diagnosis).

However, mounting a sensor device to an asset can result in an offset (e.g., reference position, position deviation, a positional deviation, a rotational offset, a rotational deviation, etc.) between the first reference frame of the sensor device and the second reference frame of the asset. This offset can result from inconsistencies in mounting the sensor to the asset, tolerances, alignment methodology, assembly factors, etc. In a specific case of a vibration sensor device, the vibration sensor device can be threaded into an asset and, as a result, rotation of the vibration sensor device with respect to the asset can result in a rotational offset between the vibration sensor device and the asset, thereby resulting in at least two coordinate axes of the vibration sensor device being misaligned. To mitigate such a misalignment, some known implementations utilize spacers or shims, such as a washer, a rotational lock or a set screw, to rotationally align the vibration sensor device relative to the asset. However, these measures can involve significant labor, an increased number of components, adjustment constraints and/or alignment features and, thus, costs to align the vibration sensor device to the asset to a requisite degree of accuracy.

Examples disclosed herein can accurately account for and/or mitigate an offset, which can be orientational and/or positional, between a data acquisition sensor device and an asset (e.g., a coordinate reference frame of the asset). Examples disclosed herein utilize a position sensor, such as a potentiometer and/or a relative position sensor, that measures the offset between the data acquisition sensor device and the asset and/or a reference frame associated with the asset. In particular, according to some examples disclosed herein, a movable portion of the position sensor is moved, displaced and/or rotated from its corresponding neutral position such that the displacement of the movable portion can be utilized for determination and/or measurement of the aforementioned offset. In particular, the movable portion can be moved by a user or installer based on a reference, such as a guide or indicator, to direct the movable portion or an indicator thereof toward the reference. Additionally or alternatively, the movable portion can be moved by the user or installer based on aligning the movable portion via a component (e.g., a fixture, an alignment tool, an alignment brace, etc.) operatively coupled to the movable portion with respect to a feature and/or guide of the asset.

In some examples, output of the data acquisition sensor device is adjusted, corrected and/or transformed based on the offset. In some such examples, a reference frame (e.g., a coordinate reference frame) of the data acquisition sensor can be transformed to a reference frame associated with the asset and/or an area/facility associated with the asset. In some examples, the data acquisition sensor device is a vibration sensor/monitor. In some examples, a marker or other reference is utilized to guide movement of the aforementioned movable portion for measurement and/or determination of the offset. In some examples, the reference is a component or indicator placed onto the asset or an environment of the asset. Additionally or alternatively, the reference is removably couplable to the data acquisition sensor device.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs)

that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

FIG. 1 illustrates an example data acquisition sensor device 100 constructed in accordance with teachings of this disclosure. The sensor device 100 may be referred to here as a sensor assembly, a monitor, a sensor system, etc. The sensor device 100 of the illustrated example includes a lid 101, a cable gland 102 and a mounting portion 103. The example sensor device 100 further includes a light indicator 104, a housing 106, and a threaded post 108 of the aforementioned mounting portion 103.

As can be seen in the illustrated view of FIG. 1, the example sensor device 100 is removably or releasably coupled and/or mounted to an asset 112. The asset 112 may be a motor, a generator, or any other type of device, component, assembly, equipment, stationary structure or a vehicle having one or more moving or vibrating portions, such as a pipe and/or a pipe system, for example. Further, the example threaded post 108 is utilized to attach the housing 106 to the asset 112.

To acquire and/or collect data with respect to the asset 112, one or more of the sensor devices 100 can be coupled (e.g., removably coupled) to the asset 112. In the illustrated example, two example sensor devices 100 are shown as coupled to the asset 112. However, in other examples only one sensor device 100 may be coupled to the asset 112. In some examples, each of the sensor devices 100 is coupled to the asset 112 by screwing the threaded post 108 into a respective threaded bore of the asset 112. In this example, each of the sensor devices 100 is implemented as a vibration monitoring device. Accordingly, the sensor devices 100 collect, monitor and/or measure vibration data of the asset 112 in a coordinate reference frame such that the sensor devices 100 provide sensor output including vibration measurements along different directions, as generally indicated by reference frame coordinate axes 120. However, the aforementioned coordinate axes 120 can be misaligned with reference frame coordinate axes 122 that corresponds to the asset 112, a reference frame of a structure/vehicle supporting or containing the asset 112 and/or an environment corresponding to the asset 112. Such a misalignment can result in false or erroneous vibration data. In particular, the sensors 100 can output data corresponding to vibration magnitudes along the wrong direction(s), which can result in misdiagnosis of issues with respect to the asset 112.

To mitigate and account for misalignment between the coordinate axes 120 of the sensor devices 100 and the coordinate axes 122 corresponding to the asset 112, some known systems rely on installers aligning the sensor devices 100 to the asset 112. In such known systems, the installers can utilize spacers (e.g., spacer disks, shims, etc.) as each of the sensor devices 100 is threaded into the asset 112. The spacers, however, can be limited in terms of accuracy and the thickness options of the spacers may introduce limitations related to threading the sensor devices 100 into the asset 112 and, thus, aligning the sensor devices 100 relative to the asset 112. Other known implementations utilize a set screw to rotationally fix the corresponding sensor device 100. To that end, utilization of the set screw can introduce design complexity and, as a result, necessitate additional components. Further, implementation of the set screw can necessitate additional volume and/or spacing to enable sufficient access for to the set screw.

As will be discussed in greater detail below in connection with FIGS. 2-12, examples disclosed herein utilize a position sensor, such as a (single turn or multi-turn) potentiometer, for indication and/or utilization of an offset (e.g., a rotational offset) of the sensor device 100 and/or data acquisition sensors thereof with respect to the asset 112 and/or a reference frame associated with the asset 112. According to examples disclosed herein, the offset can be provided and/or utilized to adjust output from the sensor device 100, thereby enabling accurate data collection even when the sensor device 100 is misaligned with respect to the asset 112. In particular, the position sensor can be displaced and/or rotated for determination of the offset to enable an adjustment (e.g., a coordinate transformation) of data transmitted (wirelessly or via a wired interface) from the sensor device 100.

Figure 2:
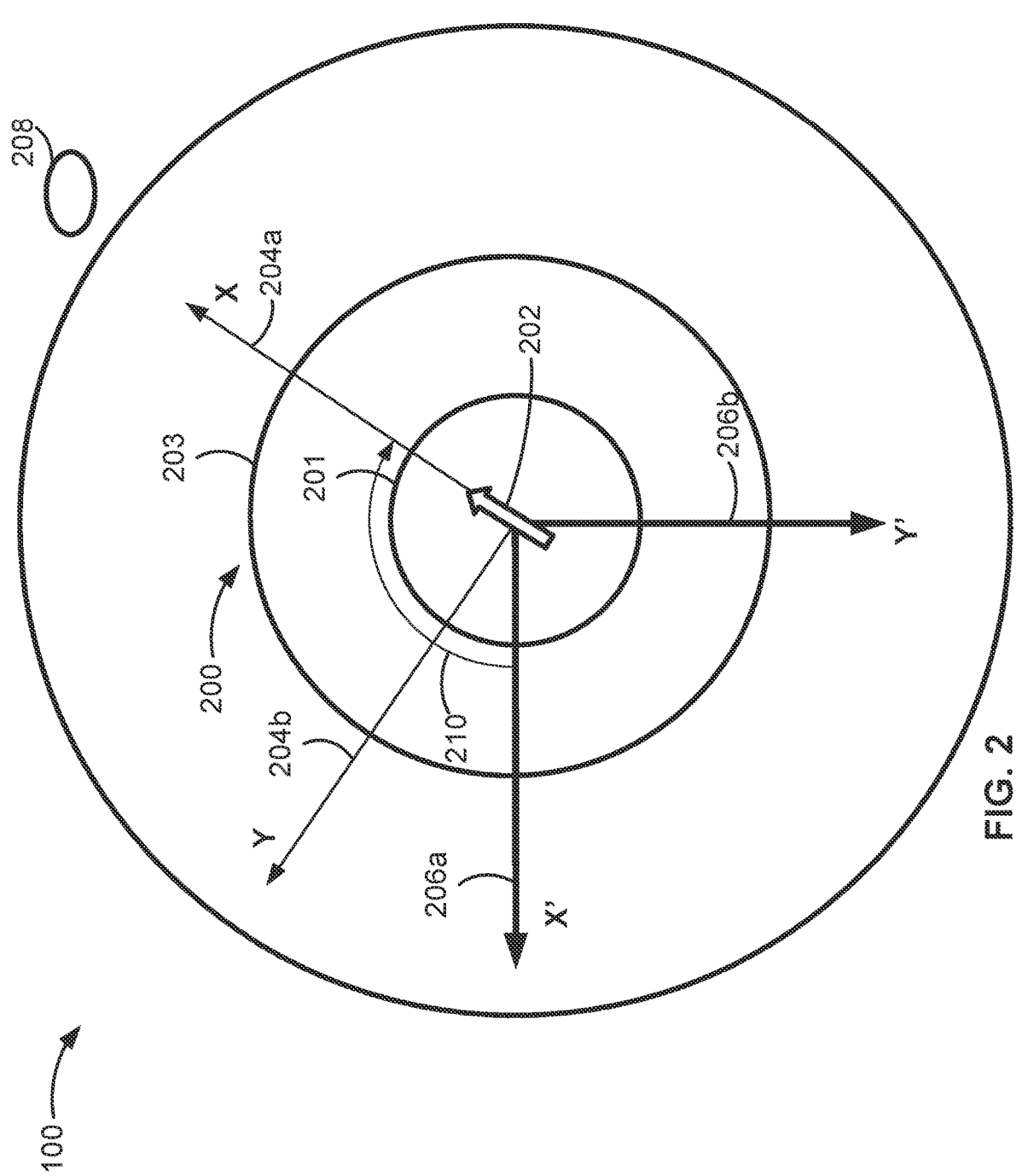
FIG. 2 is a view depicting example coordinate reference frames of the example data acquisition sensor device of FIG. 1 from a top perspective.

FIG. 2 is a view depicting example coordinate reference frames of the example sensor device 100 of FIG. 1 from a top perspective. In the illustrated example, the sensor device 100 includes a position sensor 200. The position sensor 200 includes a movable portion 201 that is moveable relative to a fixed portion 203, and the output of the position sensor 200 can be analyzed by programmable circuitry to determine the position or location of the movable portion 201 relative to the fixed portion 203. In some examples, the position sensor 200 is implemented by a potentiometer. In other examples, the position sensor 200 can be implemented by another type of sensor, such as a relative position sensor, an encoder, a potentiometer, a rotational sensor, or a magnetic sensor.

As shown in FIG. 2, the movable portion 201 includes an indicator (e.g., a direction indicator) 202, which is shaped as an arrow in this example, that moves with the movable portion 201. As can be seen in FIG. 2, coordinate axes 204$a$, 204$b$ (denoted as coordinate axes x, y) correspond to a rotational direction/orientation of the movable portion 201 being directed toward a reference 208 (e.g., a reference frame). Further, coordinates axes 206$a$, 206$b$ (denoted as coordinate axes x', y') correspond to data acquisition sensor axes of at least one data acquisition sensor (e.g., an accelerometer, a three-axis accelerometer, a motion sensor, a light sensor, a multidimensional axis accelerometer, etc.) of the sensor device 100. In some examples, the axis 206$a$ (x') can correspond to a neutral position (e.g., a zero displacement position, a zero position, etc.) of the movable portion 201.

The neutral position can have a known relationship to an overall orientation and/or an assembly coordinate system of the sensor device 100.

For determination and/or utilization of an offset (e.g., a rotational offset, a translation offset, etc.), the movable portion 201 can be rotated about an axis that extends generally perpendicular to the plane of FIG. 2, as generally indicated by an arrow 210. The angle corresponding to the arrow 210 is related to a resistance of the position sensor 200 measured (e.g., recalculated based on conditions such as movement of the movable portion 201) for correction and/or transformation of the measured sensor data. In other words, a potentiometer resistor value corresponds to a difference between a physical mounting angle and a reference mounting angle. In this example, the movable portion 201 is rotated and displaced until the aforementioned indicator 202 is generally aligned with, toward and/or facing the reference 208. According to examples disclosed herein, the position sensor 200 measures a degree of rotation of the movable portion 201 from the aforementioned neutral position as the movable portion 201 is generally aligned toward the reference 208. In turn, the degree of rotation can be provided and/or output so that readings and/or sensor output from the sensor device 100 can be adjusted and/or transformed, thereby enabling accurate measurements from the sensor device 100 without necessitating accurate alignment and/or placement of the sensor device 100 with respect to the asset 112.

In this example, the indicator 202 moves along with the movable portion 201 and is utilized to guide an installer/user to move and/or rotate the movable portion 201 to facilitate alignment of the movable portion 201 with respect to the reference 208. According to some examples disclosed herein, the installer/user can rotate the movable portion 201 with a tool, such as a screwdriver received by a tool interface of the movable portion 201, or a dial/knob, for example. In other examples, the movable portion 201 can be rotated by a hand of the operator/installer (e.g., via a knob or other hand-adjusted device). However, any other appropriate type of tool, implement or methodology can be implemented instead.

In some examples, output from the sensor device 100 is adjusted based on the degree of rotation of the movable portion 201 with respect to the neutral position once the movable portion 201 has been rotated with respect to the reference 208. In some such examples, a transformation (e.g., a coordinate system transformation, a three-dimensional transformation, etc.) of a first reference frame corresponding to the coordinate axes 204a, 204b with respect to a second reference frame corresponding to the coordinate axes 206a, 206b is performed. In some examples, the offset (e.g., offset adjustment) of the movable portion 201 is utilized by software (e.g., Key-Switch, etc.) and stored in non-volatile memory. In particular, the stored offset may be stored in a relatively permanent manner until a new offset configuration commences and/or is initialized.

According to some examples disclosed herein, a presence of a drift and/or a displacement of the sensor device 100 (e.g., due to environmental conditions, vibrations, etc.) can be accounted for in adjusting output from the sensor device 100 and/or triggering/prompting a re-adjustment of the movable portion 201. For example, a degree of shift exceeding a threshold degree of shift of the sensor device 100 and/or the movable portion 201, indicates that the offset is to be determined again (e.g., an updated correction of the output of the data sensor device is to be determined). Additionally or alternatively, the presence of the drift and/or the displacement of the movable portion 201 can be quantified by accounting for the degree of rotation of the movable portion 201 with respect to the reference 208. In some other examples, the reference 208 is a component, device or assembly positioned on or within the sensor device 100. In some such examples, the reference 208 is releasably couplable to the sensor device 100 and/or the asset 112. In a particular example, the reference 208 may be releasably coupled to the sensor device 100 and/or the asset 112 as a visual aid (e.g., a reticle) to facilitate alignment of the movable portion 201 with respect to a reference and/or reference frame.

Figure 3:
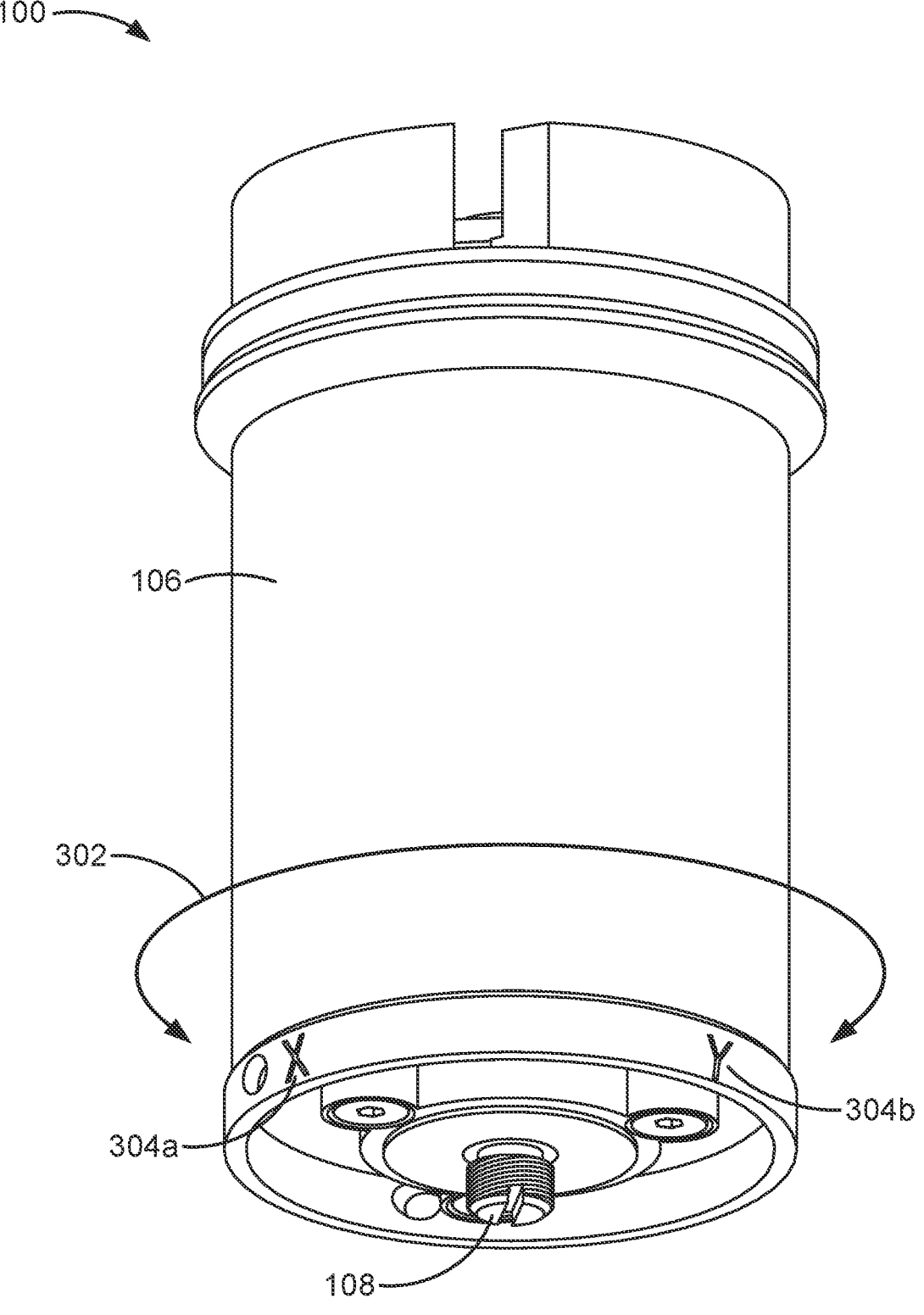
FIG. 3 depicts a partial bottom view of the example data acquisition sensor device of FIGS. 1 and 2.

FIG. 3 depicts a partial bottom view of the example data acquisition sensor device 100 of FIGS. 1 and 2. In the illustrated view of FIG. 3, the housing 106 is shown along with the threaded post 108, which at least partially defines a threaded interface to threadably couple the sensor device 100 to the asset 112 shown in FIG. 1. In this example, an arrow 302 corresponds to at least one rotational direction for threadably coupling the sensor device 100 to the asset 112 when the threaded post 108 is inserted into a corresponding threaded aperture of the asset 112. According to some examples disclosed herein, indicators 304a, 304b are implemented on a side of the housing 106 to show and/or indicate a reference frame of the sensor device 100. For example, the indicators 304a, 304b correspond to sensor axes of at least one data acquisition sensor the of the sensor device 100.

Figure 4:
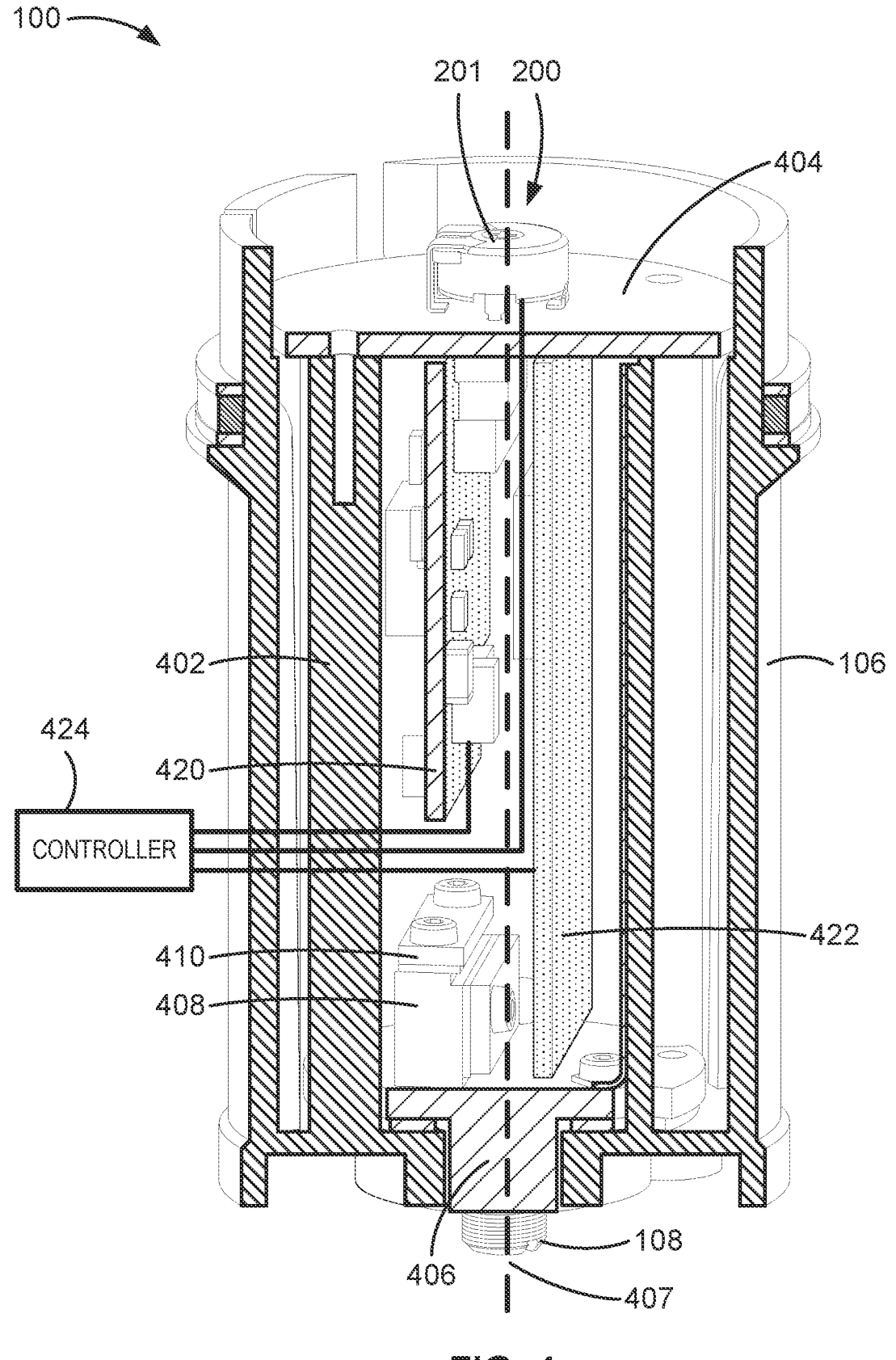
FIG. 4 depicts a perspective cross-sectional view of a portion of the example data acquisition sensor device of FIGS. 1-3.

FIG. 4 depicts a perspective cross-sectional view of a portion of the example data acquisition sensor device 100 of FIGS. 1-3. In the illustrated example of FIG. 4, the housing 106 is shown along with a sub-frame (e.g., an internal frame, an internal support, etc.) 402 that supports a circuit board (e.g., a printed circuit board, a flexible circuit board, etc.) 404, on which the example position sensor 200 described above in connection with FIG. 2 is mounted. In this example, the sub-frame 402 is coupled to and/or supports a base 406 which, in turn, supports and/or mounts the threaded post 108. In this example, a bracket (e.g., a mounting block, a support wall, etc.) 408 extending from the base 406 and/or the housing 106 supports and/or mounts a data acquisition sensor (e.g., a motion sensor, a directional motion sensor, a directional vibration sensor, a multidimensional axis sensor, an accelerometer, a three-axis sensor, etc.) 410.

In this example, the data acquisition sensor 410 is implemented as vibration sensor that measures vibration along at least one direction. Accordingly, the data acquisition sensor 410 includes a respective reference frame with corresponding coordinate axes. According to examples disclosed herein, displacement of the movable portion 201 with respect to the coordinate axes of the data acquisition sensor 410 enables accurate determination of an offset (e.g., a fixed deviation, a reference position, a position deviation, a rotational offset, a rotational deviation, etc.) of the sensor device 100 and/or the data acquisition sensor 410 with respect to the asset 112 and/or an environment of the sensor device 100. In this example, a relative position and/or orientation between the data acquisition sensor 410 and the position sensor 200 is known and/or presumed (e.g., for calculation of an offset and/or adjustment of output from the data acquisition sensor 410) based on relative positioning of the data acquisition sensor 410 onto the bracket 408 in combination with a known relative position between the bracket 408 and the position sensor 200. In other words, known or assumed spatial relationships based on assembly and/or design implementation can be employed in examples disclosed herein.

Any other appropriate type of sensors and/or sensor arrangement can be implemented instead. Further, electronics packages 420, 422, which are each implemented as circuit boards in this example, are utilized for communications and/or signal processing of measurements and/or output from the data acquisition sensor 410. According to examples disclosed herein, a controller 424 can be implemented in (e.g., mounted to) and/or communicatively coupled to the circuit board 404 and/or the electronics packages 420, 422.

In this example, the position sensor 200 is generally centered along a longitudinal center line 407 of the sensor device 100. As will be explained in greater detail below in connection with FIG. 5, this generally centered positioning of the sensor device 100 facilitates adjustment of the movable portion 201 of the position sensor 200 by a user. In other words, the position sensor 200 is placed in a region of the sensor device 100 that facilitates access thereto.

According to examples disclosed herein, to provide and/or process vibration measurements of the asset 112, the electronics packages 420, 422 and/or the controller 424 utilize measurements and/or output from the data acquisition sensor 410 in conjunction with a measurement (e.g., an offset from a neutral position) from the position sensor 200 to provide vibration data (e.g., transformed vibration data) that corresponds to a reference frame of the asset 112. In other words, the output from the data acquisition sensor 410 is transformed. The output can be transformed utilizing a coordinate transformation via known algebraic relationships and/or vector transformation, etc. or any other appropriate computational techniques and/or methodology. The measurement from the position sensor 200, which corresponds to a rotational offset of the movable portion 201, can be a measurement made during installation (e.g., the measurement is obtained in an installation process) or can be periodically measured (e.g., measured during operation of the sensor device 100, measured periodically subsequent to installation of the sensor device 100 to the asset 112, etc.). Additionally or alternatively, events and/or triggers (e.g., vibration of the asset 112 increases above a threshold vibration level, the asset 112 is turned on, the sensor device 100 senses movement, displacement and/or drift thereof, a shift of the sensor device 100 and/or the movable portion 201 exceeding a threshold degree of shift, etc.) cause data from the position sensor 200 to be obtained for subsequent adjustment of output from the data acquisition sensor 410. In some examples, a user is prompted to re-adjust the position sensor 200 based on a determination of an occurrence of the events and/or the triggers (e.g., a relatively significant shift in the sensor device 100).

Figure 5:
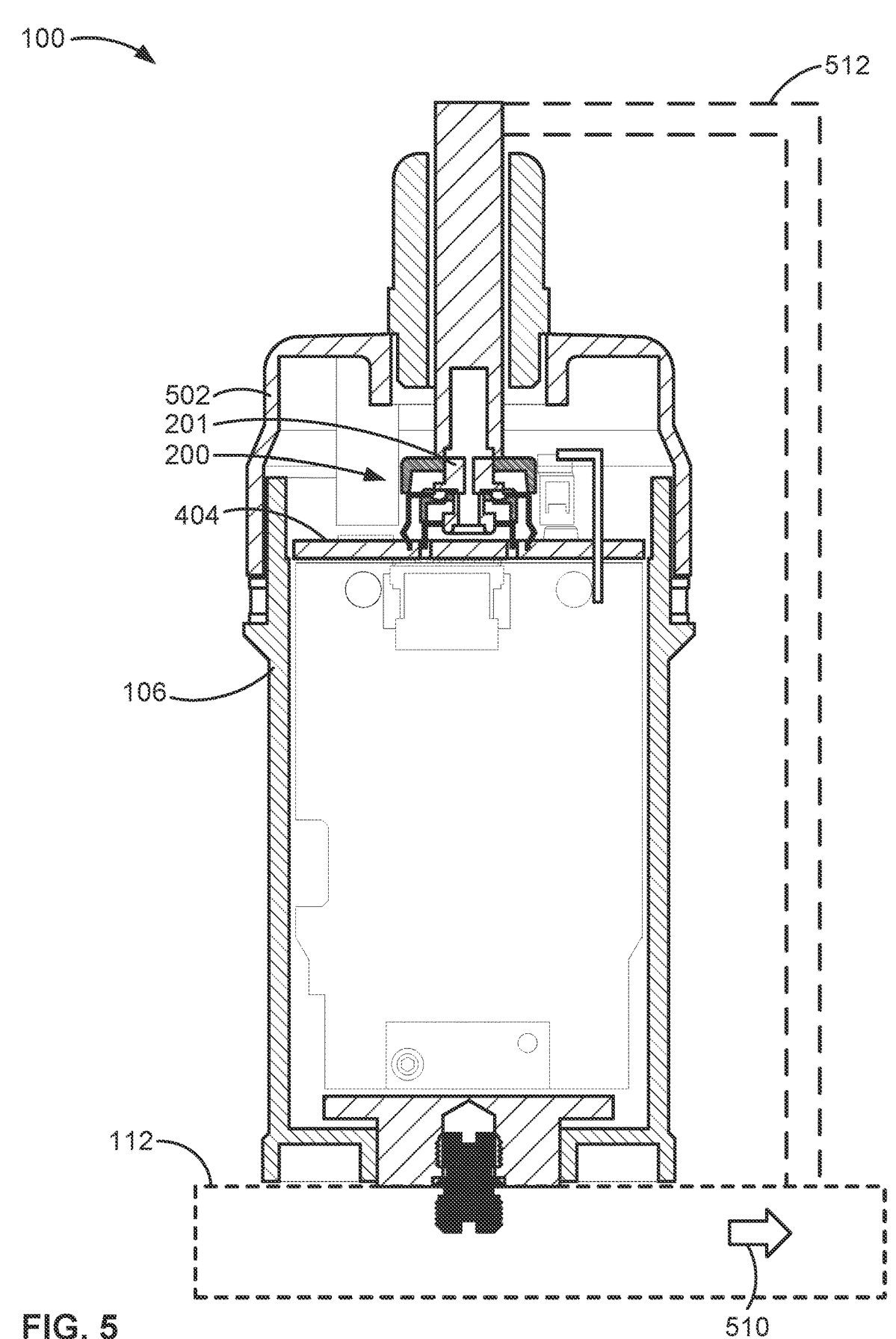
FIG. 5 is a cross-sectional view of the example data acquisition sensor device of FIGS. 1-4

FIG. 5 is a cross-sectional view of the example data acquisition sensor device 100 of FIGS. 1-4. According to the illustrated example of FIG. 5, a cover 502 is coupled to the housing 106 to at least partially enclose/cover the position sensor 200. In some examples, the cover 502 defines a relatively sealed internal volume within the sensor device 100 (e.g., via gaskets or other sealing devices/components).

According to some examples disclosed herein, a reference (e.g., a visual guide) 510 of the asset 112 is utilized to direct and/or guide an operator/installer for rotation of the movable portion 201 with a tool. In particular, the operator/installer can utilize the reference 510 as a visual cue/guide/reference to rotate the tool and, in turn, the movable portion 201. Additionally or alternatively, a fixture 512 is utilized to guide rotation of the tool and, as a result, the movable portion 201. In particular, the fixture 512 can be used as a physical guide to ensure that the tool and, thus, the movable portion 201 are aligned to a reference frame of the asset 112 to a requisite degree of accuracy by limiting/guiding movement and/or rotation of the tool. According to examples disclosed herein, the fixture 512 can be an arm or extension piece that extends to the asset 112.

Figure 6:
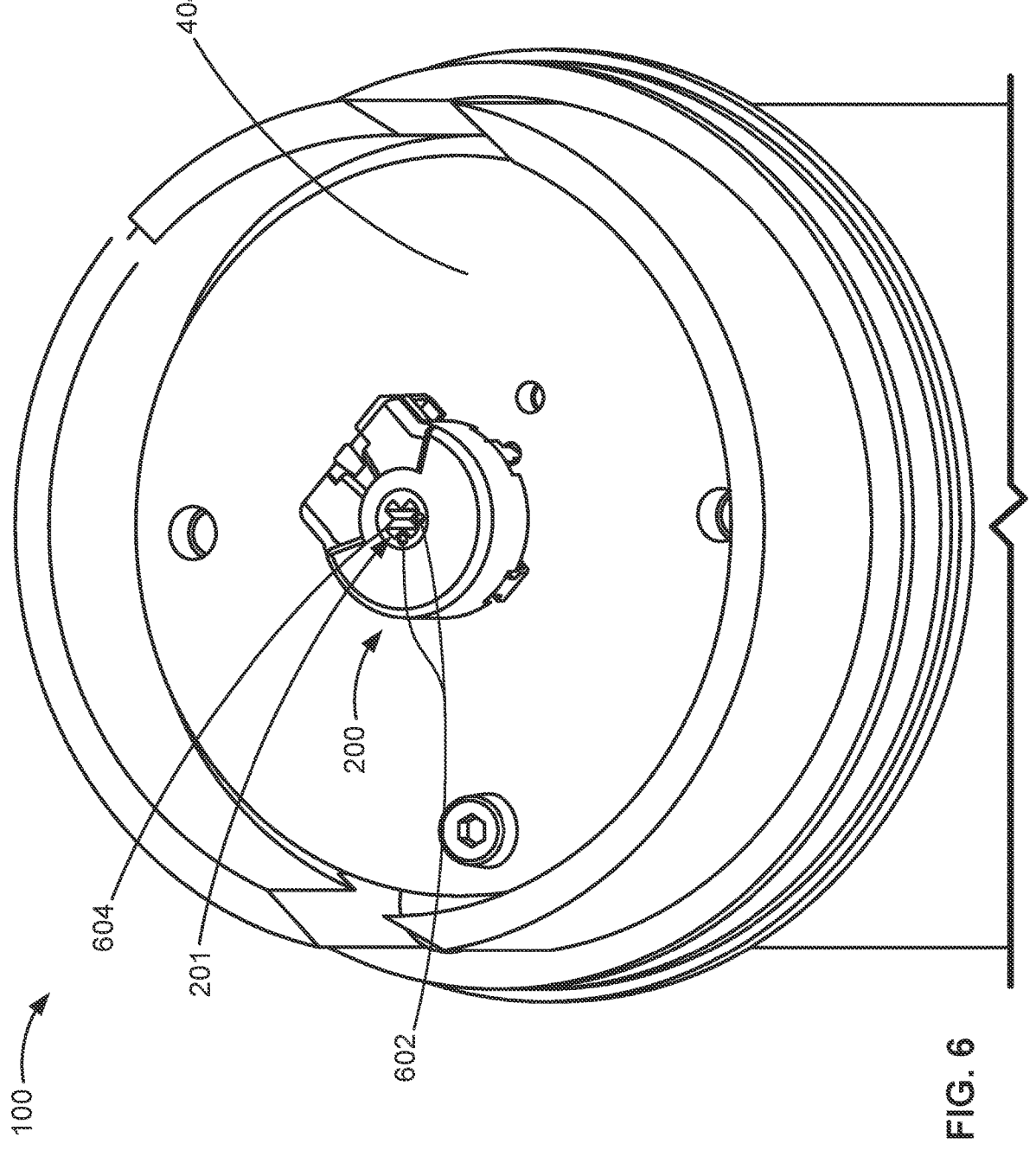
FIG. 6 is a partial perspective top view of the example data acquisition sensor device of FIGS. 1-5.

FIG. 6 is a partial perspective top view of the example sensor device 100 of FIGS. 1-5. In this example, the movable portion 201 of the position sensor 200 mounted to the circuit board 404 is shown. In this example, the movable portion 201 includes an indicator 602 that moves with the movable portion 201 to provide guidance for rotation of the movable portion 201. The indicator 602 can indicate a degree of rotation of the movable portion 201 with respect to the sensor device 100, for example. By properly aligning and/or guiding rotation of the movable portion 201, the sensor device 100 can accurately convert/transform output thereof into an appropriate reference frame or coordinate system (e.g., via a coordinate system transformation). Further, the movable portion 201 includes an aperture and/or indent 604 to receive at least a portion of a tool for rotation of the movable portion 201 with respect to the board 404 and, in turn, the sensor device 100.

Figure 7:
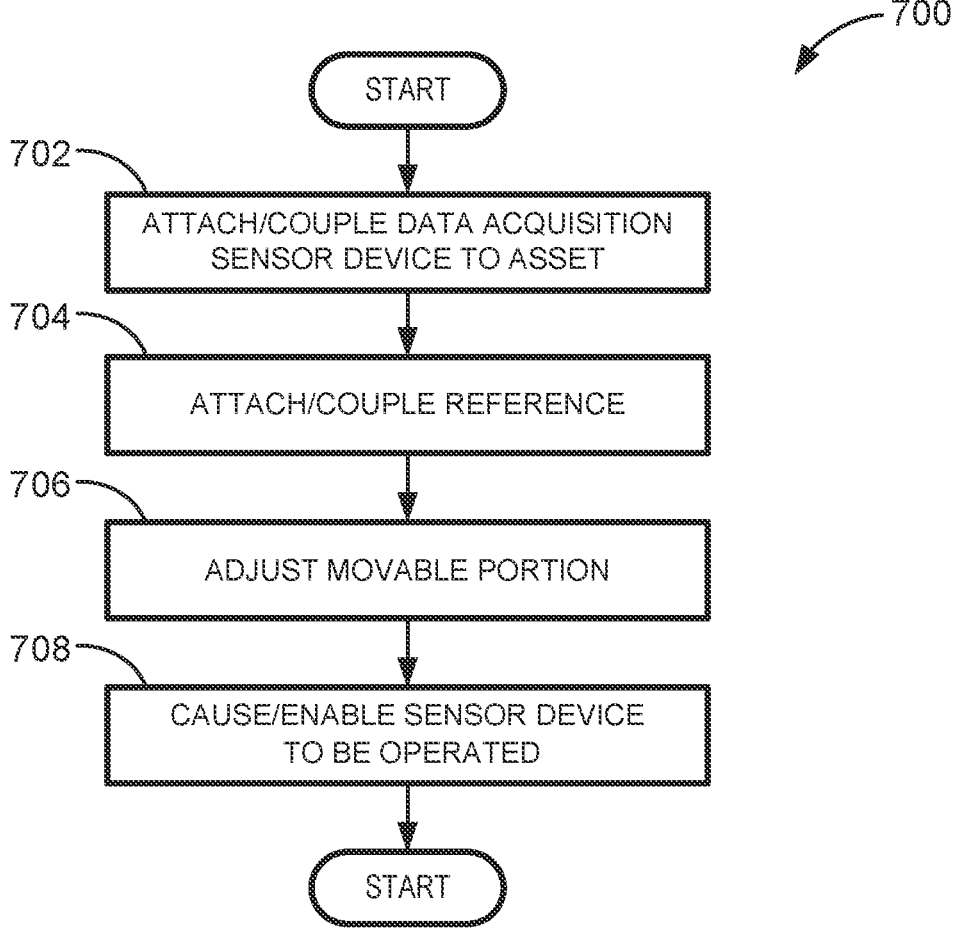
FIG. 7 is a flowchart representative of an example method in accordance with teachings of this disclosure.

FIG. 7 is a flowchart representative of an example method 700 in accordance with teachings of this disclosure. In particular, the example method 700 can be performed to enable accurate data to be obtained from the data acquisition sensor device 100. The example method 700 begins at block 702, at which the data acquisition sensor device 100 is coupled, attached and/or mounted to the asset 112. The asset 112 can be a device, component, assembly, equipment, stationary structure or a vehicle. In some examples, the sensor device 100 is threaded into the asset 112 (e.g., via the threaded post 108).

At block 704, in some examples, a reference (e.g., a reference body) is coupled to the asset 112 and/or the sensor device 100 to guide adjustment and/or movement of the movable portion 201. The reference can be associated with a geometric feature and/or structure of the asset 112 such that the reference can be aligned and/or guided based on placing the reference onto the geometric feature and/or the structure of the asset 112.

At block 706, the movable portion 201 of the position sensor 200 is adjusted, displaced and/or rotated. In this example, the movable portion 201 is adjusted and/or displaced by an operator/installer based on the aforementioned reference coupled to and/or being integral with the asset 112 (e.g., a shaft or other feature of the asset 112). In some examples, the movable portion 201 is rotated by the operator/installer with a tool. In other examples, the movable portion 201 can be rotated by a hand of the operator/installer (e.g., via a knob or other hand-adjusted device).

At block 708, the example sensor device 100 is caused and/or enabled to be operated (e.g., operation of the sensor device 100 is commenced in response to the movable portion 201 being adjusted) and the process ends. In some examples, the operator/installer provides an input to the sensor device 100 that corresponds to the movable portion 201 being adjusted based on the reference (e.g., the input indicates that adjustment/displacement of the movable portion 201 is complete). As will be discussed in greater detail below in connection with FIGS. 8-11, examples disclosed herein can indicate an offset of the sensor device 100 and/or the data acquisition sensor 410 with respect to the asset 112 and/or adjust output of the sensor device 100 and/or the data acquisition sensor 410 based on the offset.

Figure 8:
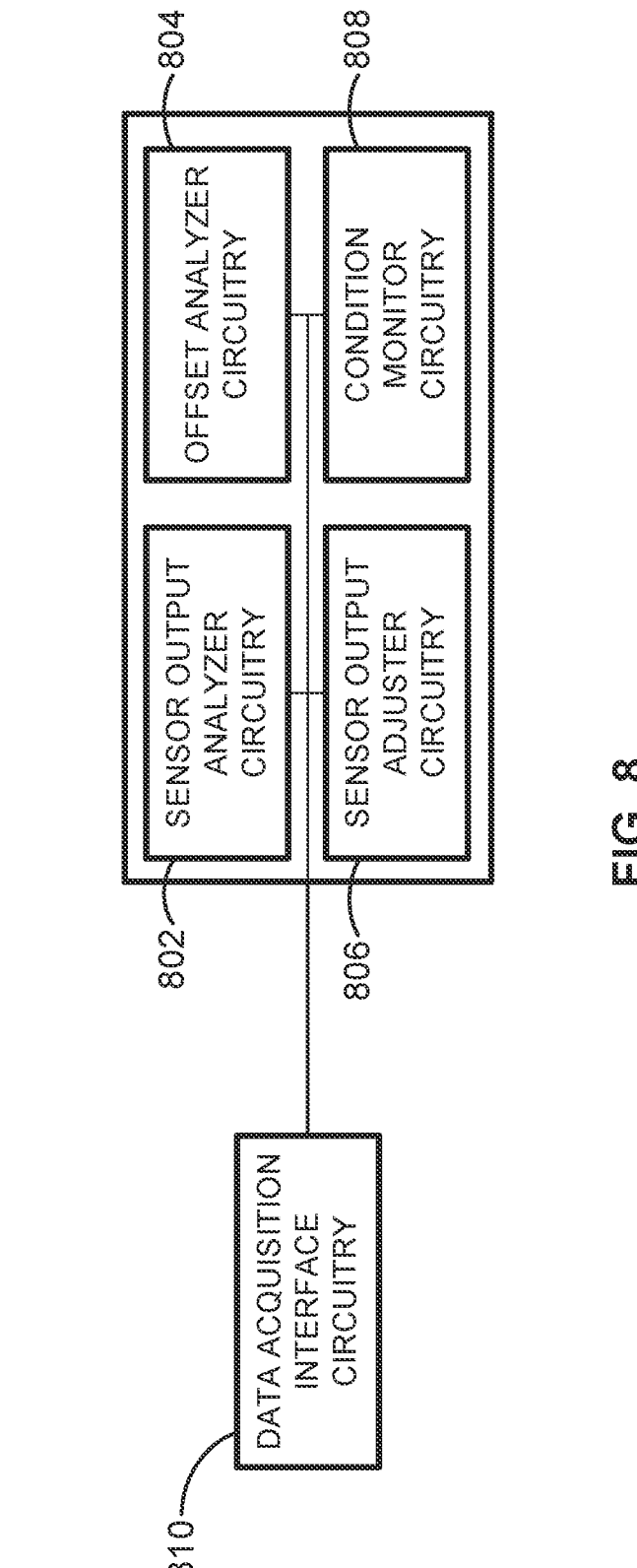
FIG. 8 is a block diagram of an example implementation of an example sensor adjustment analyzer that can be implemented in examples disclosed herein.

FIG. 8 is a block diagram of an example implementation of an example sensor adjustment analyzer 800 that can be implemented in examples disclosed herein. The example sensor adjustment analyzer 800 may be implemented in the controller 424 and/or the electronic packages 422, 424 shown in FIG. 4 and is utilized to determine, adjust and/or analyze an offset between the sensor device 100 and the asset 112 and/or an environment of the sensor device 100. The sensor adjustment analyzer 800 of FIG. 8 may be instantiated (e.g., creating an instance of, bring into being for any length of time, materialize, implement, etc.) by programmable circuitry such as a Central Processor Unit (CPU) executing first instructions. Additionally or alternatively, the sensor adjustment analyzer 800 of FIG. 8 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 8 may, thus, be instantiated at the same or different times. Some or all of the circuitry of FIG. 8 may be instantiated, for example, in one or more threads executing concurrently on hardware and/or in series on hardware. Moreover, in some examples, some or all of the circuitry of FIG. 8 may be implemented by microprocessor circuitry executing instructions and/or FPGA circuitry performing operations to implement one or more virtual machines and/or containers.

The example sensor adjustment analyzer 800 includes example sensor output analyzer circuitry 802, example offset analyzer circuitry 804, example sensor output adjuster circuitry 806, and example condition monitor circuitry 808. According to examples disclosed herein, the sensor adjustment analyzer 800 can include and/or be communicatively coupled to example data acquisition interface circuitry 810.

In this example, the sensor output analyzer circuitry 802 determines an offset of the movable portion 201 of the position sensor 200 from its neutral position such that the neutral position can correspond to a known overall orientation of the sensor device 100 and/or the data acquisition sensor 410 (e.g., via a known geometric relationship). In particular, the example sensor output analyzer circuitry 802 calculates and/or determines a rotational displacement of the movable portion 201 with respect to a coordinate frame (e.g., a coordinate axis) of the data acquisition sensor 410 and/or the neutral position based on potentiometer data from the position sensor 200 received via the data acquisition interface circuitry 810. In some examples, the output analyzer circuitry 802 is instantiated by programmable circuitry executing sensor output analyzer instructions and/or configured to perform operations such as those represented by the flowchart of FIG. 9.

The example offset analyzer circuitry 804 is implemented to calculate and/or determine an offset of the sensor device 100 and/or the data acquisition sensor 410 relative to a reference (e.g., a reference frame, a reference coordinate system, etc.) that is associated with an environment of the sensor device 100 and/or the asset 112 based on the aforementioned rotational displacement of the movable portion 201. In some examples, the offset is determined and/or calculated during an installation (e.g., an operator/installer sets the sensor device 100 in an installation/setup mode to cause the offset analyzer circuitry 804 to determine the offset). Additionally or alternatively, the offset is calculated and/or determined by the example offset analyzer circuitry 804 in intervals, which may be periodic or triggered by detected events (e.g., a detected drift of the sensor device 100, movement of the sensor device 100, etc.). In some examples, the offset analyzer circuitry 804 is instantiated by programmable circuitry executing offset analyzer instructions and/or configured to perform operations such as those represented by the flowchart of FIG. 9.

The sensor output adjuster circuitry 806 of the illustrated example is implemented to adjust, convert and/or transform output transmitted from the sensor device 100 based on the aforementioned offset. In other words, the sensor output adjuster circuitry 806 can be implemented to enable the sensor device 100 to provide output as if the sensor device 100 is aligned to the reference even if the sensor device 100 is offset (e.g., rotationally offset, translationally offset, etc.) from the reference. In some examples, the sensor output adjuster circuitry 806 is instantiated by programmable circuitry executing sensor output adjuster instructions and/or configured to perform operations such as those represented by the flowchart of FIG. 9.

According to some examples disclosed herein, condition monitor circuitry 808 is implemented to monitor and/or determine a change/shift of a relative position and/or orientation (e.g., a relative orientation) of the sensor device 100 with respect to the reference. In some such examples, the condition monitor circuitry 808 determines whether the sensor device 100 and/or the data acquisition sensor 410 has significantly drifted and/or displaced (e.g., exceeded a threshold degree of drift and/or displacement) relative to the reference and can cause and/or trigger the example offset analyzer circuitry 804 to determine an updated (or newly determined) offset of the movable portion 201. In some examples, the condition monitor circuitry 808 is instantiated by programmable circuitry executing condition monitor instructions and/or configured to perform operations such as those represented by the flowchart of FIG. 9.

In some examples, the data acquisition interface circuitry 810 is utilized to interface with sensors (e.g., vibration sensors, motion sensors, etc.), such that data output from the sensors is provided to the aforementioned sensor output analyzer circuitry 802. In some examples, the data acquisition interface circuitry 810 pre-processes data from the sensors. In some such examples, the data acquisition interface circuitry 810 may organize and/or separate the data from the sensors according to vector and/or directional components. In some examples, the data acquisition interface circuitry 810 is instantiated by programmable circuitry executing data acquisition interface instructions and/or configured to perform operations such as those represented by the flowchart of FIG. 9.

While an example manner of implementing the sensor adjustment analyzer 800 of FIG. 8 is illustrated in FIG. 8, one or more of the elements, processes, and/or devices illustrated in FIG. 8 may be combined, divided, re-arranged, omitted, eliminated, and/or implemented in any other way. Further, the example sensor output analyzer 802, the example offset analyzer circuitry 804, the example sensor output adjuster circuitry 806, the example condition monitor circuitry 808, the example data acquisition interface circuitry 810, and/or, more generally, the example sensor adjustment analyzer 800 of FIG. 8, may be implemented by hardware alone or by hardware in combination with software and/or firmware. Thus, for example, any of the example sensor output analyzer 802, the example offset analyzer circuitry 804, the example sensor output adjuster circuitry 806, the example condition monitor circuitry 808, the example data acquisition interface circuitry 810, and/or, more generally, the example sensor adjustment analyzer 800, could be implemented by programmable circuitry in combination with machine readable instructions (e.g., firmware or software), processor circuitry, analog circuit(s), digital circuit(s), logic circuit(s), programmable processor (s), programmable microcontroller(s), graphics processing unit(s) (GPU(s)), tensor processing unit(s) (TPU(s)), digital signal processor(s) (DSP(s)), ASIC(s), programmable logic device(s) (PLD(s)), and/or field programmable logic device (s) (FPLD(s)) such as FPGAs. Further still, the example sensor adjustment analyzer 800 of FIG. 8 may include one or more elements, processes, and/or devices in addition to, or instead of, those illustrated in FIG. 8, and/or may include more than one of any or all of the illustrated elements, processes and devices.

Figure 9:
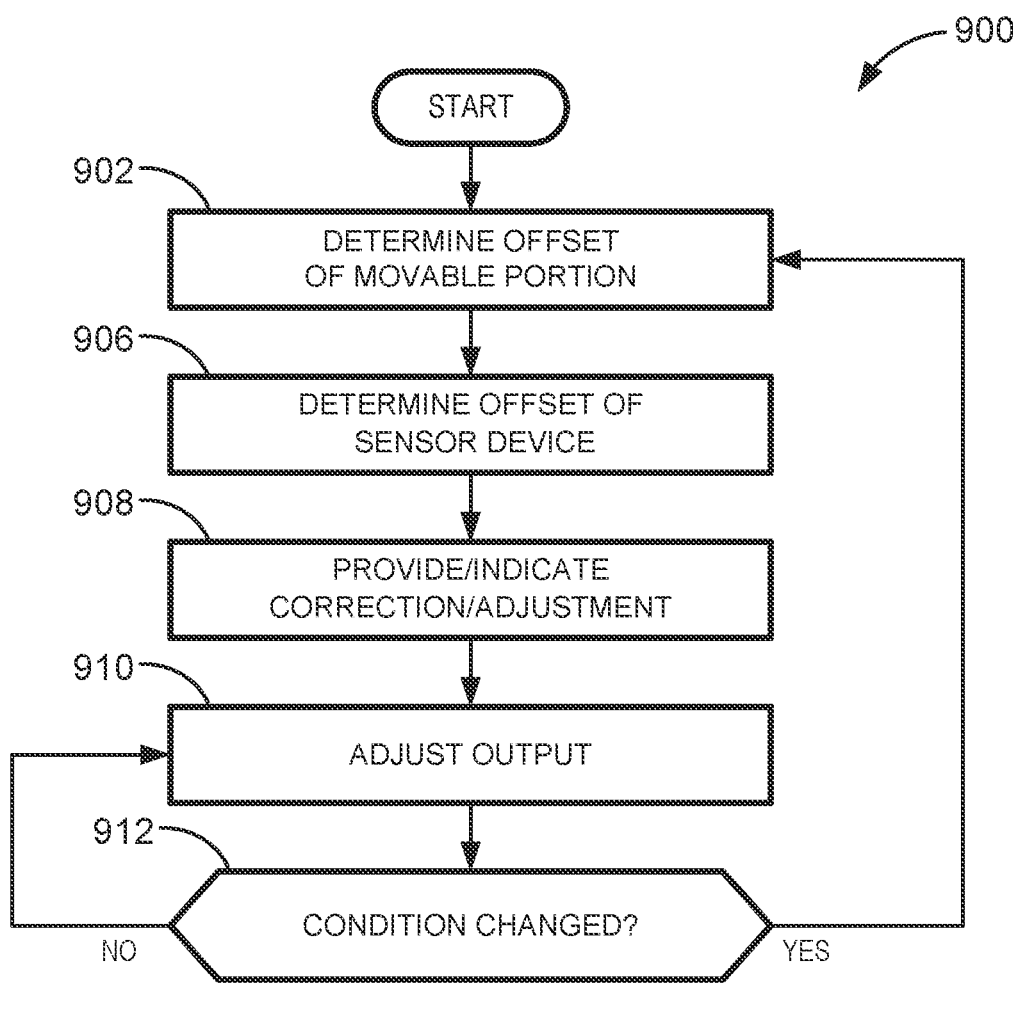
FIG. 9 is a flowchart representative of example machine readable instructions and/or example operations that may be executed, instantiated, and/or performed by example programmable circuitry to implement the example data acquisition sensor device of FIGS. 1-7 and/or the example sensor adjustment analyzer of FIG. 8.

A flowchart representative of example machine readable instructions, which may be executed by programmable circuitry to implement and/or instantiate the sensor adjustment analyzer 800 of FIG. 8 and/or representative of example operations which may be performed by programmable circuitry to implement and/or instantiate the sensor adjustment analyzer 800 of FIG. 8, is shown in FIG. 9. The machine readable instructions may be one or more executable programs or portion(s) of one or more executable programs for execution by programmable circuitry such as the programmable circuitry 1012 shown in the example processor platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 9, many other methods of implementing the example sensor adjustment analyzer 800 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed, instantiated, and/or performed by programmable circuitry to adjust output of the sensor device 100 based on an offset of the sensor device 100 with respect to the asset 112 shown in FIG. 1. Additionally or alternatively, the example machine readable instructions and/or example operations 900 can be utilized to indicate or provide the offset of the sensor device 100 with respect to the asset 112. The example machine-readable instructions and/or or the example operations 900 of FIG. 9 begin at block 902, at which the sensor output analyzer circuitry 802 causes the position sensor 200 to measure an offset of the movable portion 201 with respect to its neutral position and/or a presumed coordinate origin. In some examples, the sensor output analyzer circuitry 802 receives output from the position sensor 200 via the data acquisition interface circuitry 810.

At block 906, the example offset analyzer circuitry 804 determines an offset of the sensor device 100 to the asset 112 and/or a reference frame (e.g., a reference frame of a building/stationary structure, a reference frame of a vehicle, etc.) based on the offset and/or rotational displacement of the movable portion 201 from its aforementioned neutral position.

At block 908, the example offset analyzer circuitry 804 and/or the sensor output adjuster circuitry 806 provides/indicates a correction/offset of sensor output from the sensor device 100 and/or the data acquisition sensor 410. In a real world example, the offset of the movable portion 201 to its neutral position is 5 degrees, for example, and, in turn, the sensor device 100 with respect to the reference is 5 degrees. Accordingly, an adjustment to directional data (e.g., vibration magnitudes with directional components) accounts for the 5 degree offset by transforming directional components of the directional data by 5 degrees.

At block 910, the sensor output adjuster circuitry 806 adjusts output of the sensor device 100 and/or the data acquisition sensor 410 based on the offset of the sensor device 100 with respect to the asset 112. Returning to the aforementioned real world example mentioned above in connection with block 908, directional and/or vector components of the output of the sensor device 100 and/or the data acquisition sensor 410 can be adjusted by 5 degrees in that specific example. In other examples, un-adjusted sensor output of the sensor device 100 and/or the data acquisition sensor 410 is provided along with the offset, which is 5 degrees in the described real world example.

At block 912, in some examples, the example condition monitor circuitry 808 determines whether a condition associated with the sensor device 100 has changed (e.g., changed to a threshold degree of change). In particular, the example condition monitor circuitry 808 may determine that the sensor device 100 has moved, shifted and/or drifted such that the relative position and/or orientation of the sensor device 100 has changed to a requisite degree that exceeds a threshold degree. In a particular example, the example condition monitor circuitry 808 determines whether a degree of shift in the offset of the sensor device 100 has exceeded a threshold degree of shift. If the condition has changed (block 912), control of the process returns to block 902. Otherwise, the process returns to block 910.

Figure 10:
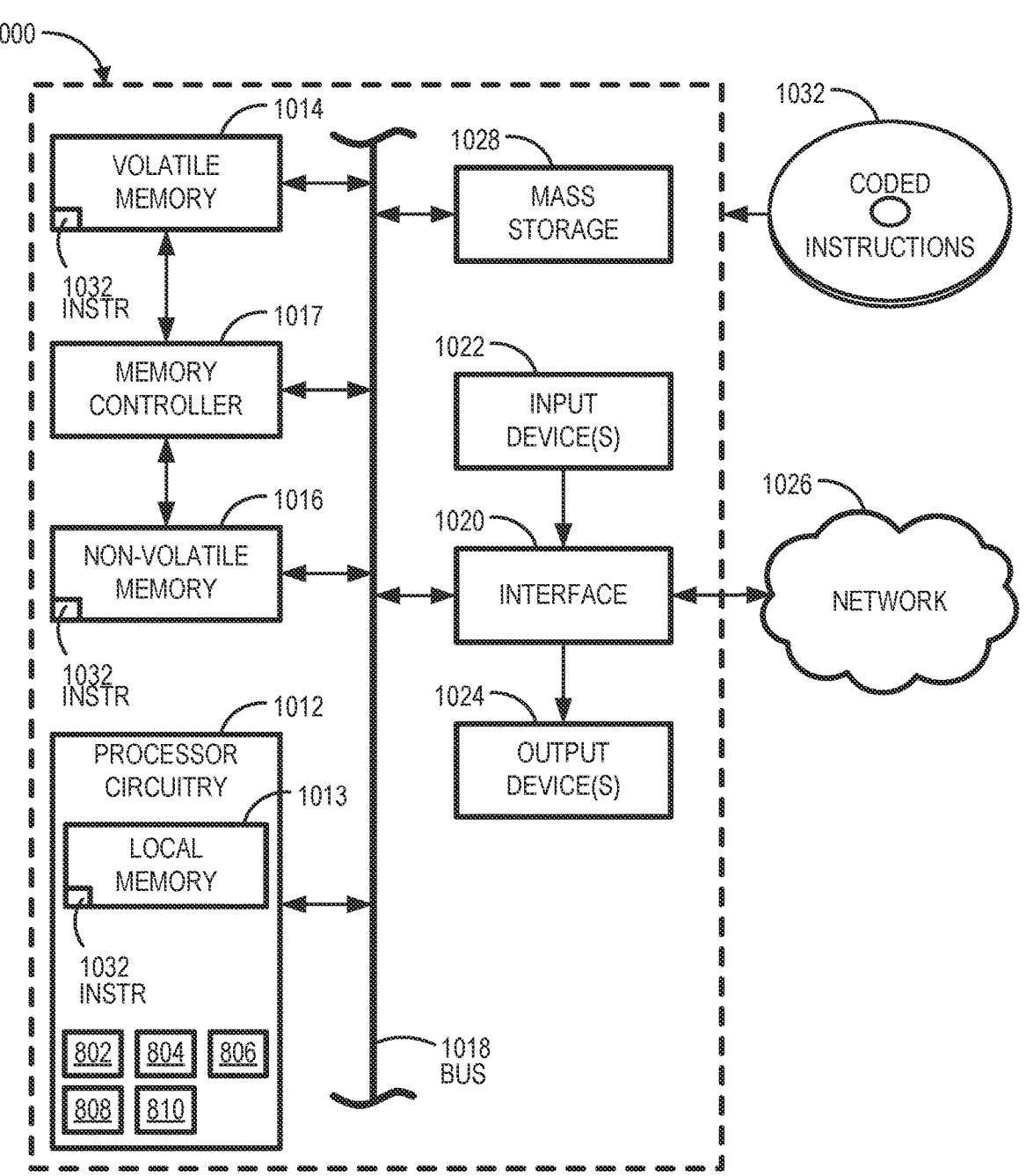
FIG. 10 is a block diagram of an example processing platform including programmable circuitry structured to execute, instantiate, and/or perform the example machine readable instructions and/or perform the example operations of FIG. 9 to implement the sensor adjustment analyzer of FIG. 8.

FIG. 10 is a block diagram of an example programmable circuitry platform 1000 structured to execute and/or instantiate the example machine-readable instructions and/or the example operations of FIG. 9 to implement the sensor adjustment analyzer 800 of FIG. 8. The programmable circuitry platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/ or microcontrollers from any desired family or manufacturer. The programmable circuitry 1012 may be implemented by one or more semiconductor based (e.g., silicon based) devices. In this example, the programmable circuitry 1012 implements the example sensor output analyzer circuitry 802, the example offset analyzer circuitry 804, the example sensor output adjuster circuitry 806, the example condition monitor circuitry 808, and the example condition monitor circuitry 810.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIG. 9, may be stored in the mass storage device 1028, in the volatile memory 1014, in the non-volatile memory 1016, and/or on at least one non-transitory computer readable storage medium such as a CD or DVD which may be removable.

Figure 11:
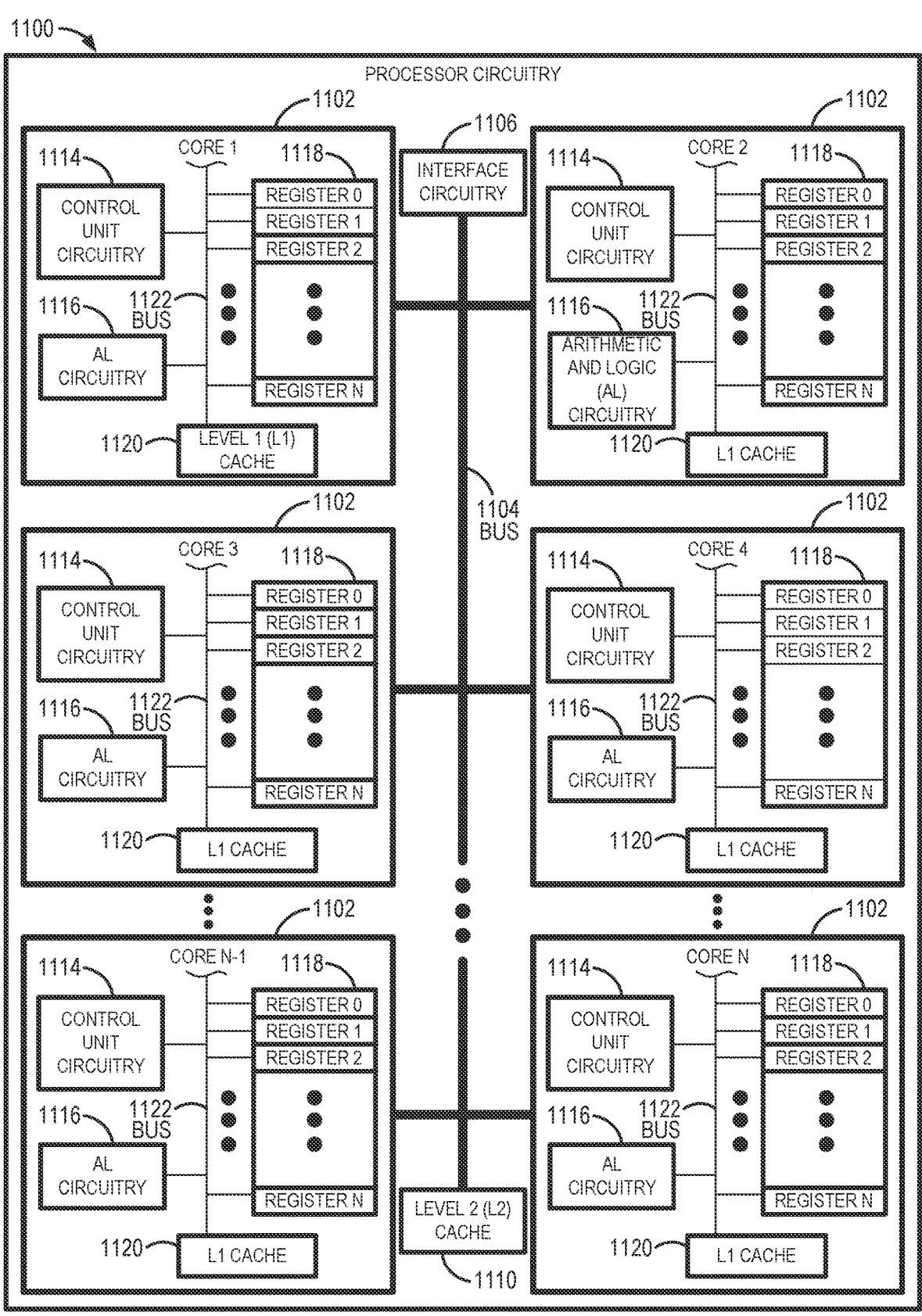
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowchart of FIG. 9 to effectively instantiate the circuitry of FIG. 2 as logic circuits to perform operations corresponding to those machine readable instructions. In some such examples, the circuitry of FIG. 8 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIG. 9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
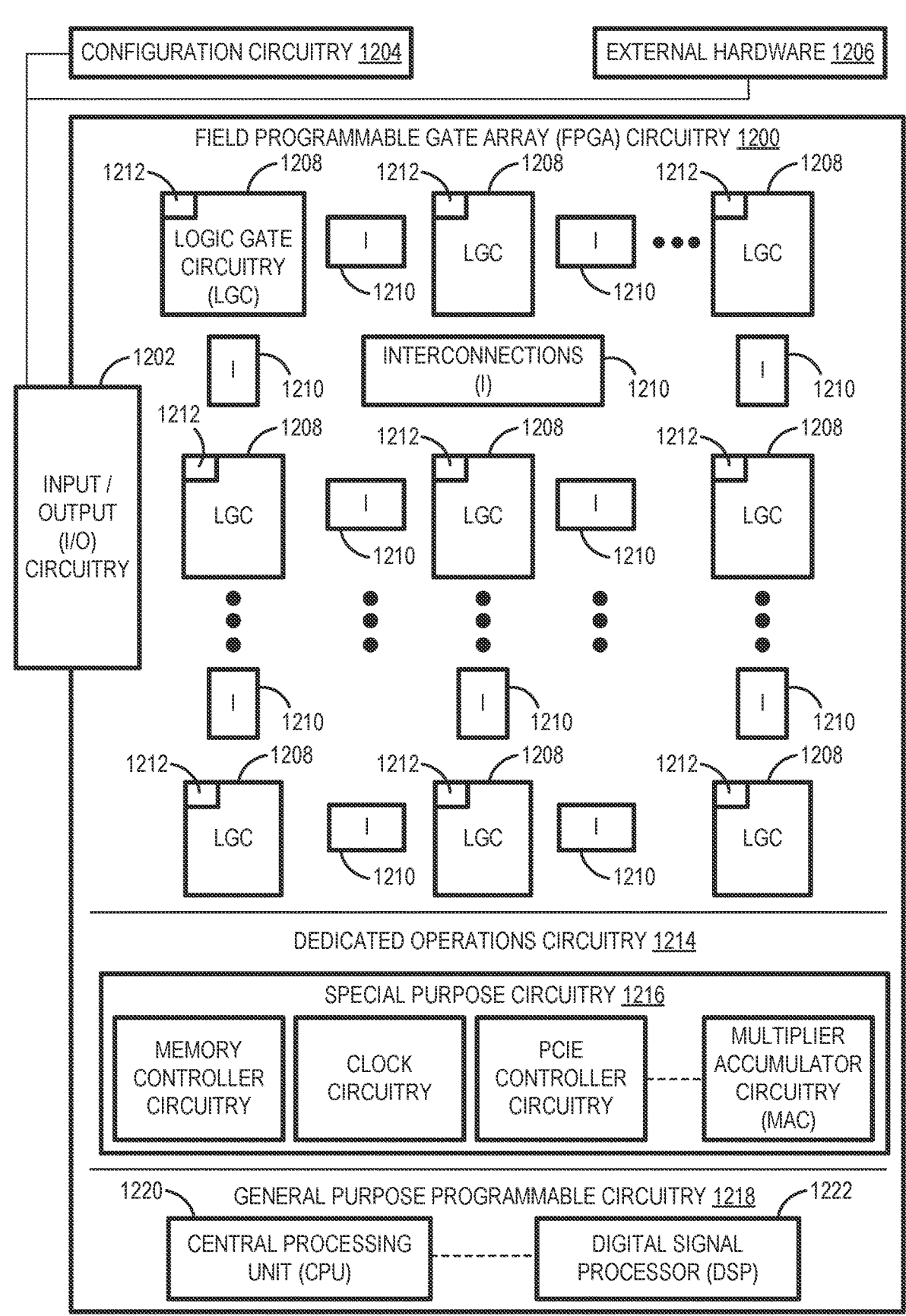
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart of FIG. 9 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/ functions corresponding to the machine readable instructions represented by the flowchart of FIG. 9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 9. As such, the FPGA circuitry 1200 may be configured and/or structured to effectively instantiate some or all of the operations/functions corresponding to the machine readable instructions of the flowchart of FIG. 9 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIG. 9 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIG. 9 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart of FIG. 9 to perform first operation(s)/function(s), the FPGA circuitry 1200 of FIG. 12 may be configured and/or structured to perform second operation(s)/function(s) corresponding to a second portion of the machine readable instructions represented by the flowchart of FIG. 9, and/or an ASIC may be configured and/or structured to perform third operation(s)/function(s) corresponding to a third portion of the machine readable instructions represented by the flowchart of FIG. 9.

It should be understood that some or all of the circuitry of FIG. 8 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 8 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 8 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Example methods, apparatus, systems, and articles of manufacture to enable mitigation of misalignment between sensors and targets are disclosed herein. Further examples and combinations thereof include the following:

Example 1 includes a sensor device for use with an asset, the sensor device comprising a housing to be coupled to the asset, a data acquisition sensor to provide first sensor output, a position sensor to provide second sensor output, the position sensor having a movable portion, and programmable circuitry to execute instructions to determine, based on the second sensor output, an offset of the movable portion for adjustment of the first sensor output, and adjust the first sensor output based on the offset.

Example 2 includes the sensor device as defined in example 1, wherein the position sensor is a potentiometer and the data acquisition sensor is a multidimensional axis accelerometer.

Example 3 includes the sensor device as defined in any of examples 1 or 2, wherein the offset is defined between (i) an orientation of the movable portion at which an indicator of the movable portion is oriented toward a reference of the asset and (ii) an orientation of the data acquisition sensor.

Example 4 includes the sensor device as defined in any of examples 1 to 3, wherein the programmable circuitry is to execute the instructions to determine the offset based on relative orientations of the data acquisition sensor and the movable portion.

Example 5 includes the sensor device as defined in any of examples 1 to 4, wherein the first sensor output is adjusted based on a coordinate system transformation associated with the offset.

Example 6 includes the sensor device as defined in any of examples 1 to 5, wherein the movable portion is rotatable and includes an interface to receive a tool, and wherein the movable portion includes a direction indicator for alignment thereof with respect to a reference of the asset.

Example 7 includes the sensor device as defined in any of examples 1 to 6, further including a fixture to limit movement of the movable portion to align the movable portion with respect to a reference of the asset.

Example 8 includes an apparatus for adjustment of output from a data acquisition sensor of a sensor device, the apparatus comprising interface circuitry communicatively coupled to a position sensor of the sensor device, machine readable instructions, and programmable circuitry to at least one of instantiate or execute the machine readable instructions to determine a positional deviation of a movable portion of the position sensor, determine an adjustment of the output of the data acquisition sensor based on the positional deviation, and adjust the output of the data acquisition sensor based on the adjustment.

Example 9 includes the apparatus as defined in example 8, wherein the programmable circuitry is to determine a rotational deviation between the data acquisition sensor and the movable portion.

Example 10 includes the apparatus as defined in any of examples 8 or 9, wherein the positional deviation corresponds to a rotational deviation of the movable portion from its neutral position.

Example 11 includes the apparatus as defined in any of examples 8 to 10, wherein the movable portion is to be displaced from its neutral position based on a reference of at least one of an asset or a reference frame.

Example 12 includes the apparatus as defined in any of examples 8 to 11, wherein the programmable circuitry is to determine that the data acquisition sensor has shifted to a degree exceeding a threshold degree of shift, and in response to determining that the data acquisition sensor has shifted to the degree exceeding the threshold degree of shift, determine an updated adjustment of the output of the data acquisition sensor.

Example 13 includes a non-transitory machine readable storage medium comprising instructions to cause programmable circuitry to at least determine an offset of a movable portion of a position sensor, the offset corresponding to orienting the movable portion with respect to a reference, determine an adjustment of output of a data acquisition sensor based on the offset, and adjust the output based on the determined adjustment.

Example 14 includes the non-transitory machine readable storage medium as defined in example 13, wherein the offset is between the reference and the data acquisition sensor.

Example 15 includes the non-transitory machine readable storage medium as defined in any of examples 13 or 14, wherein the adjustment is determined based on a coordinate transformation of a coordinate system of the reference based on the offset.

Example 16 includes the non-transitory machine readable storage medium as defined in any of examples 13 to 15, wherein the instructions cause the programmable circuitry to determine that the data acquisition sensor has shifted to a degree exceeding a threshold degree of shift, and in response to determining that the data acquisition sensor has shifted to the degree exceeding the threshold degree of shift, determine an updated adjustment of the output of the data acquisition sensor.

Example 17 includes a method comprising coupling a sensor device to an asset, the sensor device including a data acquisition sensor, adjusting an orientation of a movable portion of a position sensor based on a reference corresponding to the asset, and causing the data acquisition sensor to operate such that output from the data acquisition sensor is adjusted based on the orientation of the movable portion.

Example 18 includes the method as defined in example 17, further including aligning the orientation of the movable portion via a fixture corresponding to the reference.

Example 19 includes the method as defined in any of examples 17 or 18, wherein coupling the sensor device to the asset includes rotating the sensor device relative to the asset about a threaded interface therebetween.

Example 20 includes the method as defined in any of examples 17 to 19, further including placing a tool into an aperture of the movable portion for rotation thereof.

From the foregoing, it will be appreciated that example systems, apparatus, articles of manufacture, and methods have been disclosed that enable accurate data to be obtained from data acquisition sensors by accounting for directional misalignments that can result from installation, tolerances, mis-assembly, etc. Examples disclosed herein can reduce a need to align data acquisition sensors and, thus, can eliminate components, time and costs typically associated with the data acquisition sensors. Further, examples disclosed herein can enable more compact devices that utilize data acquisition sensors.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent. While examples disclosed herein are shown in the context of a vibration sensor, examples disclosed herein can be applied to any appropriate application or implementation that utilizes directional components and/or direction-based data.

What is claimed is:

1. A sensor device for use with an asset, the sensor device comprising:
a housing to be threadably coupled to the asset about a first axis of rotation;
a data acquisition sensor to provide a first sensor output;
a potentiometer to provide a second sensor output, the potentiometer having a movable portion that is rotatable about a second axis of rotation, the second axis of rotation aligned with the first axis of rotation; and
programmable circuitry to execute instructions to:
determine, based on the second sensor output, an offset of the movable portion for adjustment of the first sensor output, and
adjust the first sensor output based on the offset.

2. The sensor device as defined in claim 1, wherein the data acquisition sensor is a multidimensional axis accelerometer.

3. The sensor device as defined in claim 1, wherein the offset is defined between: (i) an orientation of the movable portion at which an indicator of the movable portion is oriented toward a reference of the asset and (ii) an orientation of the data acquisition sensor.

4. The sensor device as defined in claim 1, wherein the programmable circuitry is to execute the instructions to determine the offset based on relative orientations of the data acquisition sensor and the movable portion.

5. The sensor device as defined in claim 1, wherein the first sensor output is adjusted based on a coordinate system transformation associated with the offset.

6. The sensor device as defined in claim 1, wherein the movable portion includes an interface to receive a tool, and wherein the movable portion includes a direction indicator for alignment thereof with respect to a reference of the asset.

7. The sensor device as defined in claim 1, further including a fixture to limit movement of the movable portion to align the movable portion with respect to a reference of the asset.

8. An apparatus for adjustment of an output from a data acquisition sensor of a sensor device that includes a threaded portion to be threadably coupled to an asset about a first axis of rotation, the apparatus comprising:
interface circuitry communicatively coupled to a potentiometer of the sensor device;
machine readable instructions; and
programmable circuitry to at least one of instantiate or execute the machine readable instructions to:
determine a positional deviation of a movable portion of the potentiometer, the movable portion rotatable about a second axis of rotation, the second axis of rotation at least one of parallel or colinear with the first axis of rotation,
determine an adjustment of the output of the data acquisition sensor based on the positional deviation, and
adjust the output of the data acquisition sensor based on the adjustment.

9. The apparatus as defined in claim 8, wherein the programmable circuitry is to determine a rotational deviation between the data acquisition sensor and the movable portion.

10. The apparatus as defined in claim 8, wherein the positional deviation corresponds to a rotational deviation of the movable portion from a neutral position of the movable portion.

11. The apparatus as defined in claim 8, wherein the movable portion is to be displaced from a neutral position of the movable portion based on a reference of at least one of the asset or a reference frame associated with the asset.

12. The apparatus as defined in claim 8, wherein the programmable circuitry is to:

determine that the data acquisition sensor has shifted to a degree exceeding a threshold degree of shift, and in response to determining that the data acquisition sensor has shifted to the degree exceeding the threshold degree of shift, determine an updated adjustment of the output of the data acquisition sensor.

13. A non-transitory machine readable storage medium comprising instructions to cause programmable circuitry to at least:

determine an offset of a movable portion of a potentiometer, the movable portion rotatable about a first axis of rotation, the offset corresponding to orienting the movable portion with respect to a reference, determine an adjustment of an output of a data acquisition sensor based on the offset, the data acquisition sensor threaded into an asset about a second axis of rotation that is aligned with the first axis of rotation, and adjust the output based on the determined adjustment.

14. The non-transitory machine readable storage medium as defined in claim 13, wherein the offset is between the reference and the data acquisition sensor.

15. The non-transitory machine readable storage medium as defined in claim 13, wherein the adjustment is determined based on a coordinate transformation of a coordinate system of the reference based on the offset.

16. The non-transitory machine readable storage medium as defined in claim 13, wherein the instructions are to cause the programmable circuitry to:

determine that the data acquisition sensor has shifted to a degree exceeding a threshold degree of shift, and in response to determining that the data acquisition sensor has shifted to the degree exceeding the threshold degree of shift, determine an updated adjustment of the output of the data acquisition sensor.

17. A method comprising:

coupling a sensor device to an asset via a threaded interface, the threaded interface defining a first axis of rotation, the sensor device including a data acquisition sensor;

adjusting an orientation of a movable portion of a potentiometer based on a reference corresponding to the asset, the movable portion rotatable about a second axis of rotation that is parallel to the first axis of rotation; and causing the data acquisition sensor to operate such that an output from the data acquisition sensor is adjusted based on the orientation of the movable portion.

18. The method as defined in claim 17, further including aligning the orientation of the movable portion via a fixture corresponding to the reference.

19. The method as defined in claim 17, wherein the coupling of the sensor device to the asset includes rotating the sensor device relative to the asset about the threaded interface therebetween.

20. The method as defined in claim 17, further including placing a tool into an aperture of the movable portion for rotation thereof.

* * * * *